(12) United States Patent
Galzin et al.

(10) Patent No.: US 10,053,220 B2
(45) Date of Patent: Aug. 21, 2018

(54) AIR CONDITIONING SYSTEM FOR A "MORE ELECTRIC" AIRPLANE

(71) Applicant: LIEBHERR-AEROSPACE TOULOUSE SAS, Toulouse (FR)

(72) Inventors: Guillaume Galzin, Toulouse (FR); Vincent Gomez, Cepet (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 5 days.

(21) Appl. No.: 15/507,099

(22) PCT Filed: Sep. 4, 2015

(86) PCT No.: PCT/FR2015/052358
§ 371 (c)(1),
(2) Date: Jul. 14, 2017

(87) PCT Pub. No.: WO2016/034830
PCT Pub. Date: Mar. 10, 2016

(65) Prior Publication Data
US 2017/0355466 A1     Dec. 14, 2017

(30) Foreign Application Priority Data
Sep. 5, 2014 (FR) .................................. 14 58359

(51) Int. Cl.
*B64D 13/08* (2006.01)
*B64D 13/06* (2006.01)
(52) U.S. Cl.
CPC ...... *B64D 13/08* (2013.01); *B64D 2013/0618* (2013.01); *B64D 2013/0644* (2013.01); *B64D 2013/0688* (2013.01)

(58) Field of Classification Search
CPC ............ B64D 13/08; B64D 2013/0644; B64D 2013/0688; B64D 2013/0618;
(Continued)

(56) References Cited

U.S. PATENT DOCUMENTS

| 6,402,482 | B1 * | 6/2002 | Lee | F01D 15/08 |
| | | | | 417/243 |
| 6,526,775 | B1 * | 3/2003 | Asfia | B64D 13/06 |
| | | | | 62/401 |

(Continued)

FOREIGN PATENT DOCUMENTS

EP         2592001 A2    5/2013

*Primary Examiner* — Mohammad M Ali
(74) *Attorney, Agent, or Firm* — Volpe & Koenig, P.C.

(57) ABSTRACT

An aircraft air conditioning system, powered solely using electrical energy, to draw bleed air from outside the aircraft and deliver conditioned air to the aircraft's interior, includes at most three motorized rotary machines, which include: independent first and second motorized turbocompressors, each turbocompressor includes a turbine compressor and an electric motor; and a motor compressor interconnected between the turbocompressors via an interconnection pipe. The motor compressor: generates a primary air flow, which drives a secondary air flow, allowing a breathing air flow to be cooled in a first operation phase, corresponding to a ground operation or at relatively low altitude and relatively low aircraft speed; be at shutdown or at low idle in a second phase of operation at relatively low altitude and relatively high aircraft speed; and, provide a top up breathing air flow in a third phase of operation at relatively high altitude and relatively high aircraft speed.

10 Claims, 4 Drawing Sheets

(58) Field of Classification Search
CPC ............ B64D 2013/0648; B64D 37/32; B64D 13/02; B64D 13/006; F25B 9/10; F25B 9/008; F28F 9/02; F28F 27/02; Y02T 50/56; Y02T 50/44; Y02T 50/671
USPC .......................................................... 62/401
See application file for complete search history.

(56) References Cited

U.S. PATENT DOCUMENTS

| | | | | |
|---|---|---|---|---|
| 6,725,643 | B1* | 4/2004 | Paul | F01D 1/28 60/39.162 |
| 7,467,524 | B2* | 12/2008 | Brutscher | B64D 13/06 62/401 |
| 7,607,318 | B2* | 10/2009 | Lui | B64D 13/06 244/118.5 |
| 7,797,962 | B2 | 9/2010 | Kresser et al. | |
| 7,908,861 | B2* | 3/2011 | Chino | F01K 17/005 60/645 |
| 7,958,873 | B2* | 6/2011 | Ernst | F02G 5/02 123/568.12 |
| 8,323,000 | B2* | 12/2012 | Mirsky | F01D 15/08 417/295 |
| 2003/0005719 | A1* | 1/2003 | Mitani | B64D 13/06 62/402 |
| 2007/0113579 | A1 | 5/2007 | Claeys et al. | |
| 2013/0118191 | A1* | 5/2013 | Zywiak | B64D 13/06 62/87 |
| 2013/0192223 | A1* | 8/2013 | Pierpont | F02B 37/007 60/605.2 |

\* cited by examiner

AIR CONDITIONING SYSTEM FOR A "MORE ELECTRIC" AIRPLANE

TECHNICAL FIELD

This invention generally relates to an air conditioning system.

The invention has applications, in particular, in the field of aeronautics. It relates more particularly to the context of a "more electric" aircraft.

PRIOR ART

The aircraft marketed nowadays include three sources of secondary energies generated using the combustion of the primary energy, i.e. kerosene. These secondary energies are hydraulic energy, pneumatic energy and electrical energy. They are used to power various loads onboard the aircraft.

Current research tends to substitute a single source of electrical energy for these three sources of energy. This is referred to as the "more electric" aircraft.

However, with the passage to the "more electric" aircraft, certain systems have to be modified in order to adapt to the disappearance of the hydraulic and/or pneumatic energy. This is the case with the air conditioning system which currently uses pneumatic energy by drawing compressed air directly in the propulsion heat engines of the aircraft. The air conditioning system has several functions: provide a certain flow rate of fresh air in the pressurized zone (in order to provide a renewal rate of the dioxygen that is sufficient for the occupants and a sufficient quantity of air for the pressurization system), dry the air sent to the pressurized zone and provide the functions of air conditioning and heating.

Solutions already exist for adapting the air conditioning system to the context of the "more electric" aircraft. A first solution has an air conditioning system that is currently onboard the latest wide-bodied aircraft of a North American manufacturer, comprising a first part of drawing and compressing air from outside and a second part of conditioning the drawn air. The drawing and compression part comprise four motor compressors and the conditioning part comprises two packs with each one comprising a turbocompressor. This first solution therefore comprises six rotating machines.

A second solution, described in U.S. Pat. No. 7,797,962, is comprises two packs that provide the drawing of the air from outside, the compression thereof and the conditioning thereof, and each comprising a motor compressor and a motorized turbocompressor. This second solution therefore comprises four rotating machines.

However, rotating machines are heavy and bulky. In addition, they are generally expensive, and have to be controlled by complex power electronics. Their large number complicates the architecture which generates indirect development and maintenance costs.

SUMMARY OF THE INVENTION

The invention aims to attenuate all or a portion of the disadvantages of the prior art mentioned hereinabove.

This invention has for purpose to propose a new architecture for an air conditioning system consuming solely electrical energy as a secondary energy generated onboard an aircraft.

This invention aims in particular to reduce the number of rotating machines used in order to decrease the complexity, weight, bulkiness and the cost of the system.

To this effect, a first aspect of the invention proposes an air conditioning system for an aircraft powered solely using electrical energy, intended to draw bleed air from outside the aircraft and deliver conditioned air to the interior of the aircraft. The air conditioning system comprises at most three motorized rotating machines comprising:
- a first and a second motorized turbocompressor which are independent of one another, each motorized turbocompressor comprising a compressor, of a turbine and of an electric motor; and
- a motor compressor interconnected between the motorized turbocompressors via an interconnection pipe and comprising a compressor and an electric motor, and wherein the motor compressor is arranged to:
- generate a primary air flow, which drives a secondary air flow, allowing a flow of air for breathing to be cooled in a first phase of operation, corresponding to a phase of operation on the ground or at relatively low altitude and at relatively low aircraft speed;
- be at shutdown or at low idle in a second phase of operation at relatively low altitude and relatively high aircraft speed; and,
- provide a top up flow of air for breathing in a third phase of operation at relatively high altitude and relatively high aircraft speed.

Such an air conditioning system that comprises only three motorized rotating machines, i.e. two motorized turbocompressors and a motor compressor, is particularly well suited for the drawing, pressurization and conditioning of outside air and provides the system, directly, with substantial savings in weight, bulkiness and cost. The air conditioning system also has a simplified architecture. In addition, such an air conditioning system is then powered electrically by only three supply channels, with each one supplying one of the respective rotating machines. As such, reducing the number of rotating machines and the number of electrical channels indirectly makes it possible to further reduce the complexity, bulkiness, weight and cost of the electrical system and consequently to potentially reduce the overall fuel consumption of the aircraft.

Advantageously, the motor compressor has two separate but complementary functions, used alternatively according to the various phases of operation of the aircraft. Furthermore, several configurations of the system can be set up to introduce redundancy, in order to remedy any breakdowns of this motor compressor.

The system proposed as such makes it possible to suppress a motor compressor with respect to systems of prior art while still improving the energy efficiency of the air conditioning system without sacrificing any of its effectiveness or its robustness with respect to any breakdowns.

With a concern for optimizing the invention, the interconnection pipe can furthermore be adapted to, in the third phase of operation, supplement with substantially equal parts the flow rate of compressed air respectively supplied by the compressor of each motorized turbocompressor, using the compressed air by the motor compressor.

In an advantageous embodiment, the interconnection pipe comprises at least two isolation valves each positioned between the motor compressor and one of the respective motorized turbocompressors, said isolation valves being adapted to allow for a balancing of the system in a nominal operating mode and the reconfiguration thereof in a degraded operating mode in the event of a breakdown.

As such, the closing of the isolation valves, in the third phase, makes it possible to isolate one of the motorized turbocompressors or the motor compressor in case of a breakdown of one of these machines. The isolation valves therefore make it possible, advantageously, to control the flow rate of air supplied by the motor compressor and also to keep the system operational in case of a breakdown of a rotating machine.

In certain embodiments, the air conditioning system further comprises at least one inlet plenum adapted to supply outside air to the compressors of the motorized rotating machines using at least one Ramair inlet. Having a centralized air inlet makes it possible to both simplify and balance the air conditioning system.

One embodiment provides that the air conditioning system comprises:
- at least a first and a second flow orifices each associated with one of the respective motorized turbocompressors and each comprising a device for injecting air supplied with air by the motor compressor in the first phase of operation;
- at least a first and a second heat exchangers, each associated with one of the respective motorized turbocompressors and with one of the respective flow orifices, with each heat exchanger being adapted to cool the air for breathing passing through it using a secondary air flow generated by the associated flow orifice.

Furthermore, each flow orifice is adapted to ventilate the respective motorized turbocompressor and wherein at least one of the flow orifices is adapted to, furthermore, ventilate the motor compressor.

Because of this, the motor compressor associated with the two flow orifices advantageously makes it possible to create a secondary air flow making it possible to cool the air for breathing sent in the pressurized zone, in the first phase.

Advantageously, the air conditioning system can also comprise, furthermore, at least four ventilation valves adapted to regulate the ventilation of the system through the flow orifices, with a first ventilation valve being positioned in order to carry out a connection between the first flow orifice and the first motorized turbocompressor, a second ventilation valve being positioned in order to carry out a connection between the first flow orifice and the motor compressor, with a third ventilation valve being positioned in order to carry out a connection between a second flow orifice and the second motorized turbocompressor and a fourth ventilation valve being positioned to carry out a connection between the second flow orifice and the motor compressor.

Consequently, the closing and/or the opening of the ventilation valves makes it possible to isolate the motor compressor in case of a breakdown of the latter and as such create a redundancy of equipment by using the air supplied by the compressors of the motorized turbocompressors in order to supply the flow orifices.

With a concern for comfort, the air conditioning system can comprise at least a first and a second device for drying air, with each one associated with one of the respective motorized turbocompressors as well as with one of the respective exchangers. The drying device makes it possible to dehumidify the air before sending it to the pressurized zone.

In order to save energy, the air conditioning system can include, furthermore, at least a first and a second altitude valve, with each one making it possible to avoid one of the respective drying devices as well as the turbine of the motorized turbocompressor associated with said drying device. Indeed, when the outside air is not wet, it is then not necessary to dry it. This is the case, for example for an operation of the system during a high altitude phase of the flight.

Such an air conditioning system can be such that its electrical power supply is provided by an electrical power supply network comprising an electrical power supply channel for each motorized rotating machine. Each supply channel is then connected to one of the rotating machines. There are therefore three electrical power supply networks only, instead of four in prior art.

BRIEF DESCRIPTION OF THE DRAWINGS

Other characteristics and advantages of the invention shall further appear when reading the following description. These latter are purely for the purposes of illustration and must be read with respect to the annexed drawings wherein.

DETAILED DESCRIPTION OF THE PREFERRED EMBODIMENTS

Figure 1:
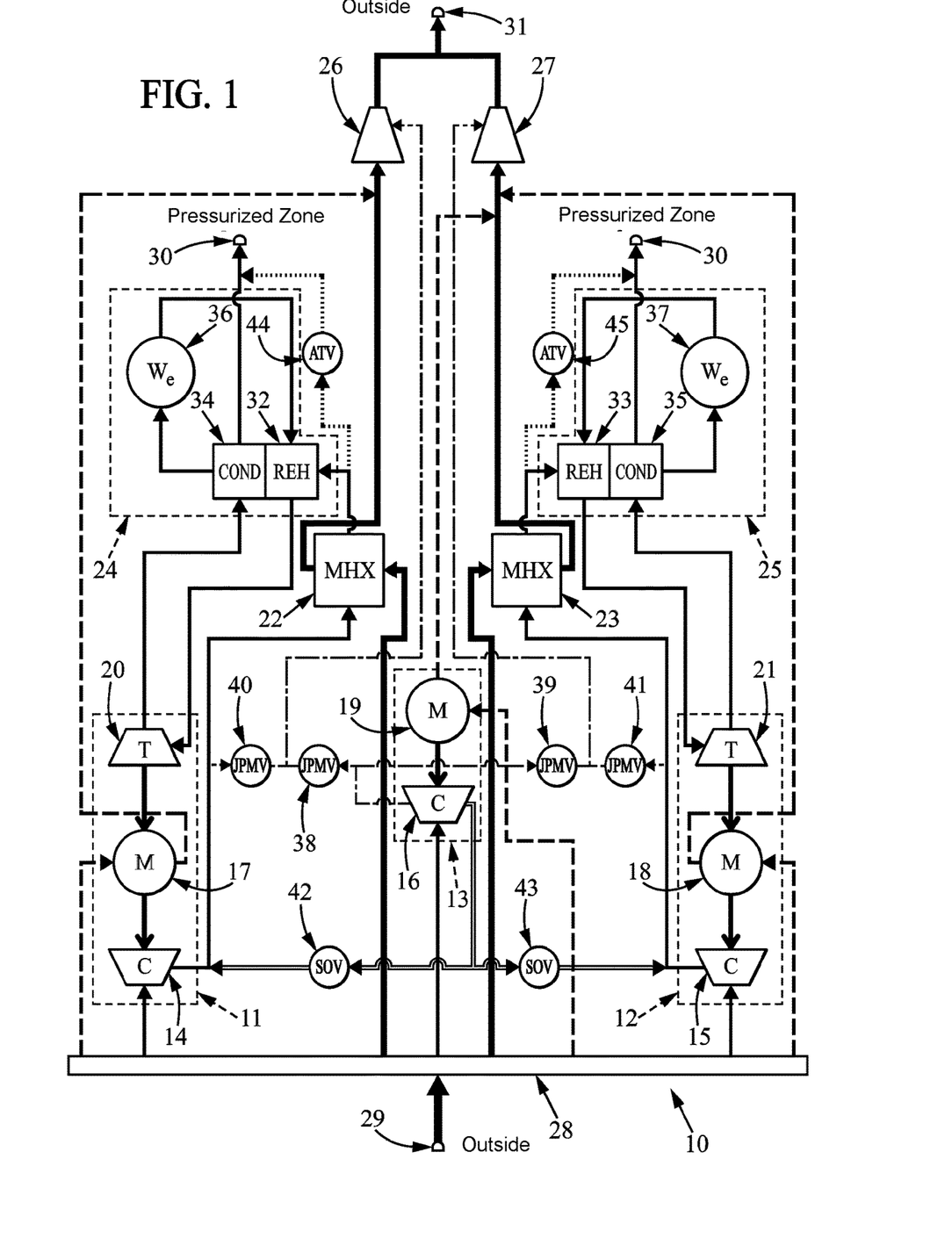
FIG. 1 is a functional diagram showing an air conditioning system according to embodiments of the invention.

FIG. 1 shows the general structure of an embodiment of an air conditioning system 10 according to embodiments of this invention.

The air conditioning system 10 has for functions to provide a certain flow rate of air in the pressurized zone (with a certain rate of renewal of dioxygen), to pressurize the pressurized zone, possibly to dry the air sent to the pressurized zone and, furthermore, top provide the functions of heating and air conditioning. The air sent into the pressurized zone can be comprised in part of the air supplied by the system 10, referred to as air for breathing, and in part by recirculation air, i.e. air drawn in the pressurized zone, which is filtered before being reinjected therein.

The system 10 can be placed onboard a "more electric" aircraft.

In such an application, the system 10 comprises for example two packs for drawing and for conditioning air. A first pack comprises a motorized turbocompressor 11 and a second pack comprises another motorized turbocompressor 12. In addition a single motor compressor 13 is associated with the two motorized turbocompressors via an interconnection pipe (shown in the figures by a double solid line). The air conditioning system 10 then comprises three motorized rotating machines.

In the example shown in FIG. 1, the motorized turbocompressor 11 comprises a compressor 14, an electric motor 17 and a turbine 20; likewise the motorized turbocompressor 12 comprises a compressor 15, an electric motor 18 and a turbine 21; finally, the motor compressor 13 comprises a compressor 16 and an electric motor 19.

A compressor consumes energy to compress air; on the contrary a turbine expands air by supplying energy. As such the compressors 14, 15 consume electrical energy transformed into mechanical energy by the motors 17, 18 respectively, as well as pneumatic energy transformed into mechanical energy by the turbines 20, 21 respectively. The compressor 16 consumes only the electrical energy transformed into mechanical energy by the motor 19.

In this example, the first pack further comprises a heat exchanger 22, a drying device 24 and a flow orifice 26. Similarly, the second pack comprises a heat exchanger 23, a drying device 25 and a flow orifice 27.

The air conditioning system 10 draws in outside air (shown in the figures by a solid bold arrow), preferably, via a Ramair inlet 29 associated with a centralized plenum inlet 28. The air drawn is then distributed by the plenum 28 between the various components of said system 10 according to need. In an alternative embodiment, the drawing of the outside air could be done using several inlets, for example an inlet for each component that uses this air.

The air drawn is then distributed to the two packs, preferentially in an equal manner. In the rest of the description, only the operation of the first pack shall be described but the operation of the second pack is identical to that of the first pack.

Once the outside air is pressurized by the two packs, the latter is injected into the pressurized zone of the aircraft via an internal outlet 30. A portion of the drawn outside air which is not pressurized, is discharged outside of the aircraft via an external outlet 31. The external outlet 31 is, in this example, a Ramair outlet.

On a typical aircraft flight profile, the air conditioning system described has three separate phases. A first phase of operation, referred to as the phase on the ground, is a phase of operation on the ground or at a relatively low altitude and at a relatively slow speed. A second phase of operation is a flight phase at a relatively low altitude and at a relatively high speed. The second phase of operation can therefore be identified with the phases of starting to climb or of the end of descent of the aircraft as well as with the holding and approaching phases of the aircraft that precede landing. Finally, a third phase of operation, referred to as the cruising phase, is a flight phase at a relatively high altitude and at a relatively high speed. The third phase of operation can therefore be identified with the phases of the end of climbing or the beginning of descent of the aircraft as well as with the cruising flight phase.

The altitude corresponding to the transition between the second phase and the third phase as well as the speed corresponding to the transition between the first phase and the second phase depend on the sizing of the packs, and more precisely on the sizing of the compressors, as well as the characteristics of the aircraft. In particular, the speed of the aircraft can be considered as high speed when this speed is sufficient to self-ventilate the system, i.e. for driving the secondary air flow. The invention is not limited by the value of the altitude and of the speed.

Figure 2:
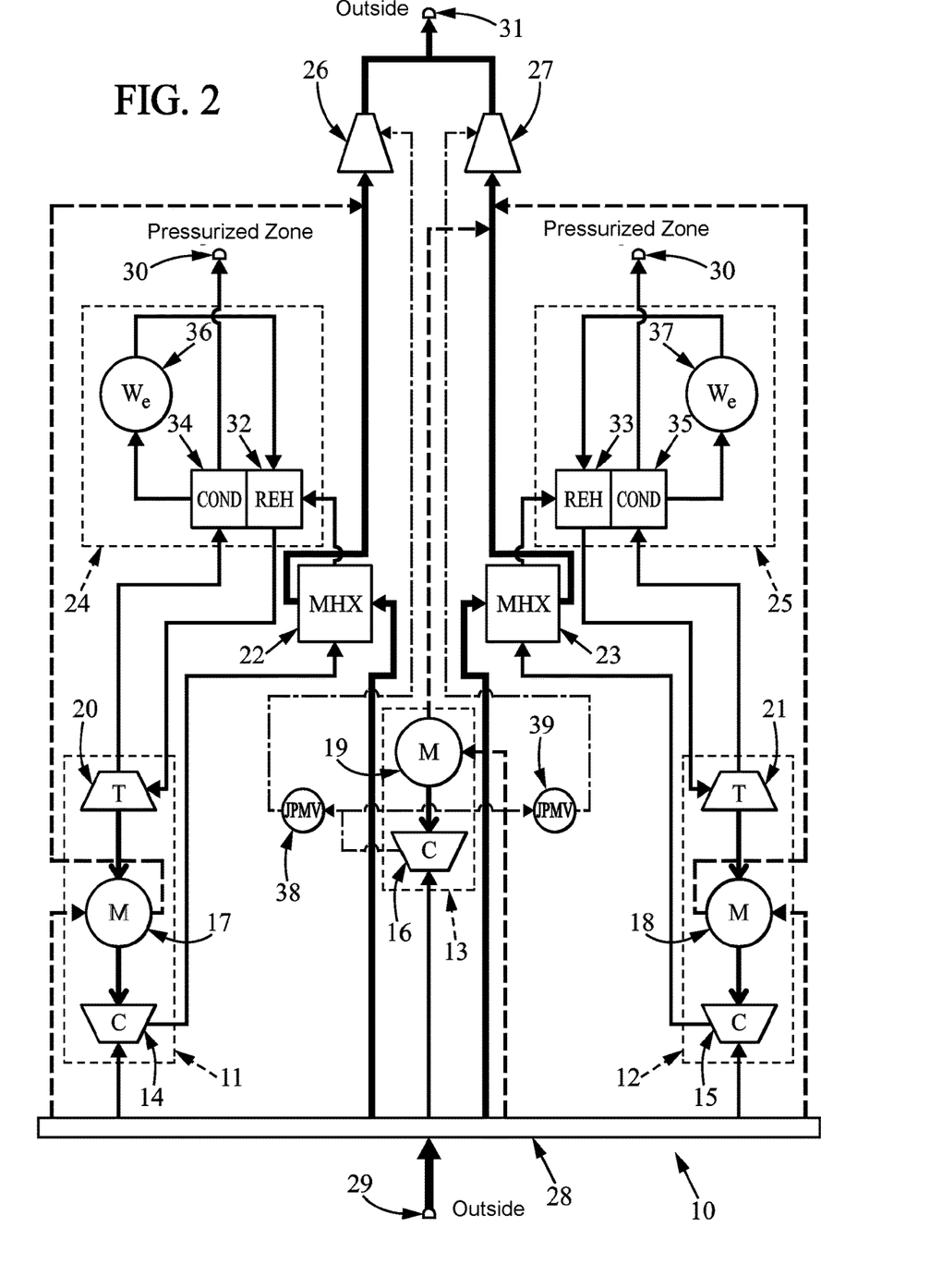
FIG. 2 is a functional diagram showing an air conditioning system, in a first phase of operation, according to an embodiment of the invention.

In reference to FIG. 2, the air conditioning system 10 is first of all shown in the first phase on the ground.

The flow of air for breathing (shown in the figures by a thin solid line), which is the air injected into the pressurized zone, is therefore drawn from outside the aircraft via the Ramair inlet 29 and distributed via the plenum 28 to the first pack and in parallel to the second pack. The compressor 14 of the motorized turbocompressor 11 then compresses this flow of air for breathing. This has the consequence of increasing the pressure and the temperature of the air passing through it, with the increase in the temperature being directly linked to the increase in the pressure of the air.

The flow of air for breathing is then cooled by passing through the exchanger 22. It is then dehumidified by passing through the drying device 24 forming a water separation loop. The latter comprises for example a heater 32, a condenser 34 and a water extractor 36. Similarly, the drying device 25 of the second pack comprises a heater 33, a condenser 35 and a water extractor 37.

Finally, the flow of air for breathing passes through the turbine 20 of the motorized turbocompressor 11 in order to be expanded before again passing through the condenser 34 of the drying device 24 in order to be injected into the pressurized zone via the internal outlet 30.

As such, in the phase of operation on the ground, the two motorized turbocompressors 11, 12 each provide, for example approximately half of the total flow rate of the air for breathing supplied to the pressurized zone.

The exchanger 22 therefore has for purpose to cool this air before it is injected into the pressurized zone. To do this the secondary air flow (shown in the figures by a thick solid line), which has a colder temperature than that of the air for breathing, can exchange via conduction with the flow of air for breathing in the exchanger. The flow of air for breathing is then cooled while the secondary air flow is heated.

The secondary air flow comes from outside the aircraft, via the Ramair inlet 29, and is discharged outside of the aircraft, via the external outlet 31, after having passed through the exchanger 22 in order to remove the heat.

In order to create the secondary air flow passing through the exchanger 22, the flow orifice 26 is positioned between the outlet of the exchanger 22 and the outlet of the external outlet 31. In this embodiment of the invention, the flow orifice 26 is a tube. Similarly the flow orifice 27 of the second pack can also be a tube. However in another embodiment, the flow orifices 26, 27 could be ventilations such as for example electric fans.

The function of the flow orifice 26 is to create a vacuum in order to drive the air upstream of said orifice and as such create the movement of the secondary air flow using from the plenum 28 to the external outlet 31. In order to create the vacuum in the framework of a flow orifice of the tube type, air that has a pressure that is higher than the air to be driven corresponding to the primary air can be injected, via an injector, into the flow orifice 26 to the external output 31.

In the first phase, the motor compressor 13 supplies, using the outside air, compressed air to the injector. Indeed, the compressor 16 compresses the air distributed by the plenum 28 and via a ventilation valve 38 supplies a primary air flow (shown in the figures by a dot-and-dash line) to the injector. Similarly, the compressor 16 supplies air to the injector of the flow orifice 25 of the second pack via a ventilation valve 39.

Furthermore, in the phase on the ground, the compressor 16 consumes electrical energy transformed into mechanical energy by the associated electric motor 19. The energy consumed by the compressor 14 is, in part, electrical energy transformed into mechanical energy by the associated motor 17 and, for a portion, pneumatic energy transformed into mechanical energy by the associated turbine 20.

Electric motors need to be cooled. For this, a flow of ventilation air (shown in the figures by a bold dotted line) passes through the three motors 17, 18, 19. This flow of ventilation air comes from outside the aircraft, for example via the plenum 28, and is discharged outside the aircraft, for example via the external outlet 31. The flow of ventilation air can be driven, during the phase on the ground, in the same way as the secondary air flow, i.e. by the flow orifices 26, 27.

Figure 3:
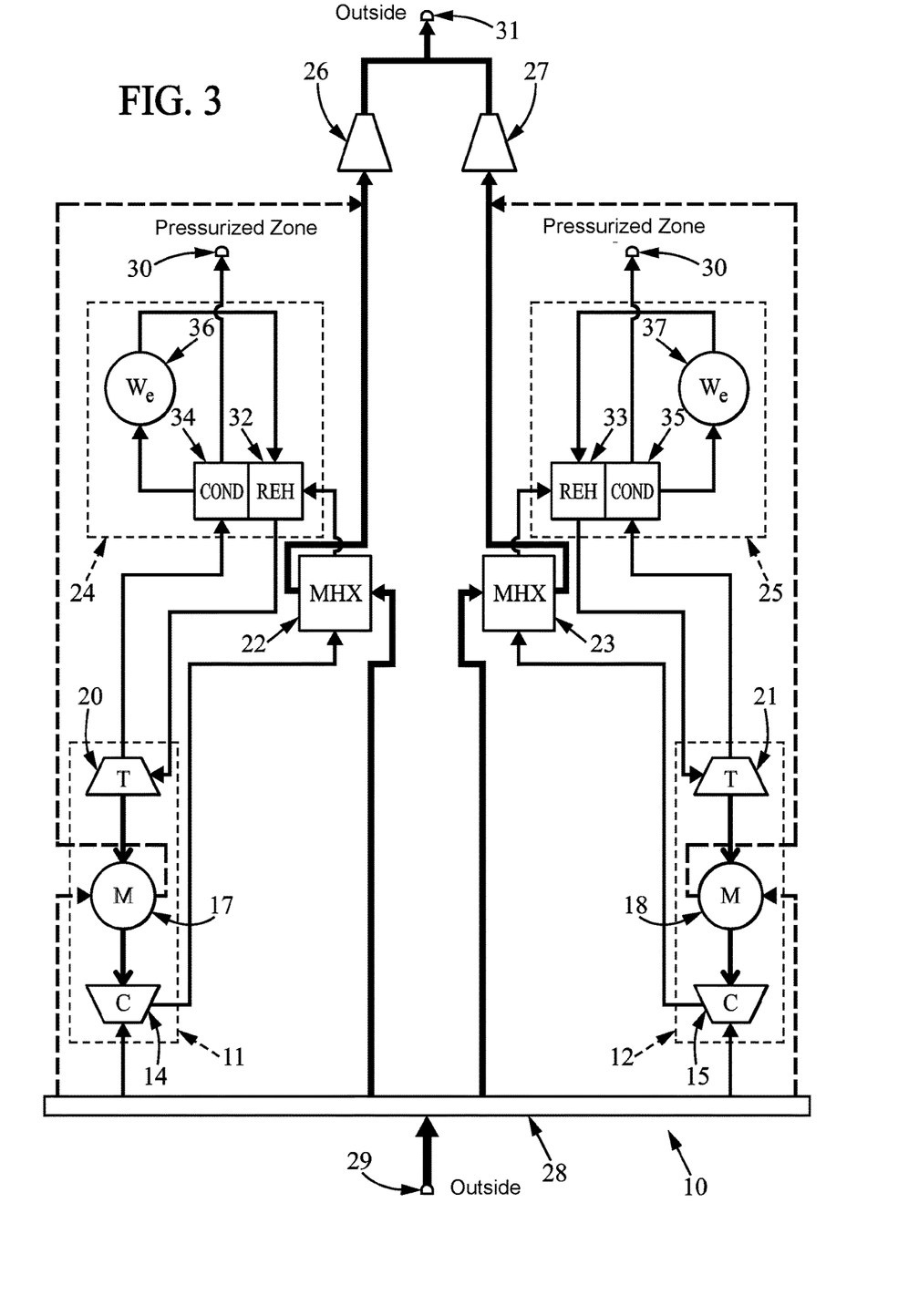
FIG. 3 is a functional diagram showing an air conditioning system, in a second phase of operation, according to an embodiment of the invention.

In reference to FIG. 3, the air conditioning system 10 is shown in the second phase of operation of the aircraft between the operation on the ground and the operation in flight at high altitude.

In this second phase, the operation of the air conditioning system 10 remains globally the same as in the first phase.

However, in the second phase, the aircraft is moving at a higher speed than in the first phase. As such, the secondary air flow no longer needs to be driven by the flow orifices 36, 37. The same applies for the flow of ventilation air. Indeed, the air is driven thanks to the Ramair dynamic pressure generated by the speed of the aircraft. The ventilation valves 38, 39, 40, 41 are closed and there is therefore no longer any flow of primary air supplied by the motor compressor 13.

As such in this second phase, the motor compressor 13 can operate at a slow speed or even be stopped in order to save the electrical energy available onboard the aircraft.

Figure 4:
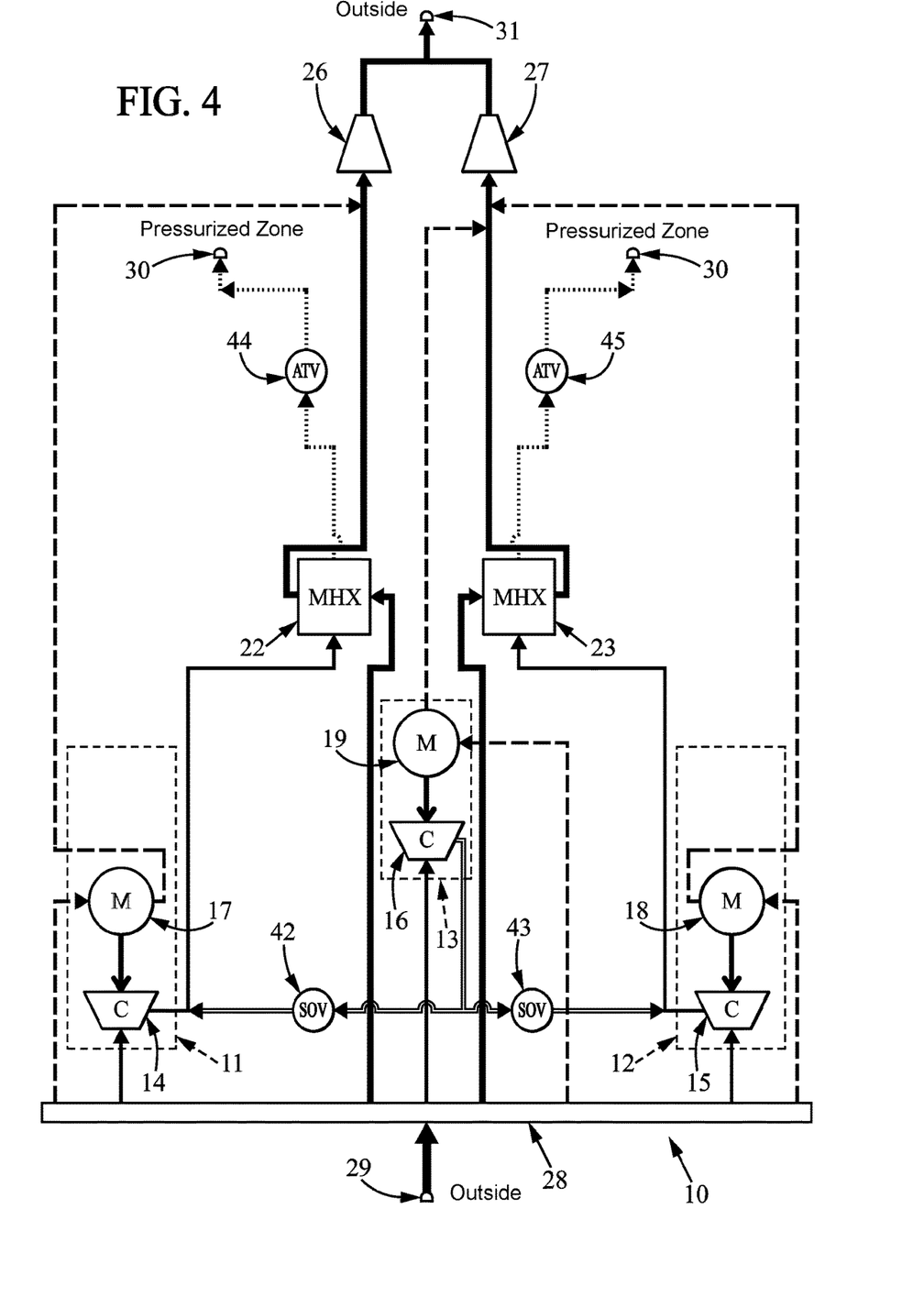
FIG. 4 is a functional diagram showing an air conditioning system, in a third phase of operation, according to an embodiment of the invention.

In reference to FIG. 4, the air conditioning system 10 is shown in the third phase of cruising, or high altitude phase of the flight.

In the cruising phase the aircraft moves at a high speed as in the second phase. As such the secondary air flow and the flow of ventilation air also do not have to be driven by the flow orifices 36, 37.

Furthermore in the cruising phase, the outside air has a lower pressure and a lower temperature in relation to those of the outside air of the other phases.

The outside air at high altitude is also dry, it is therefore not necessary to dry it using the devices for drying 24, 25.

As such in the cruising phase, an altitude valve 44 which is positioned between the outlet of the exchanger 22 and the internal outlet 30 can be opened in order to allow the flow of air for breathing to be injected directly into the pressurized zone without passing through the drying device 24 and the turbine 20, via an altitude pipe (shown in the figures by a dotted line). Similarly for the second pack, an altitude valve 45 which is positioned between the outlet of the exchanger 23 and the internal outlet 30 can be opened in order to divert the flow of air for breathing and to allow it to be injected directly into the pressurized zone without passing through the drying device 25 and the turbine 21. During the phase on the ground and the second phase, these altitude valves 44, 45 are generally closed.

In the cruising phase, the turbines 20, 21 which are no longer operating therefore do not supply any energy to the respectively associated compressors 14, 15. The motors 17, 18 then supply to the respectively associated compressors 14, 15 all of the required energy.

In light of the properties of air at an altitude and the capacities of the volumetric flow rate of the compressors, the total flow rate supplied in the pressurized zone must be shared over the three compressors 14, 15, 16. To do this, the motor compressor 13, which starting from the second phase no longer supplies the primary air flow, is then used to supplement the flow rates of air injected into the pressurized zone of each motorized turbocompressor 11, 12. This therefore makes it possible to top up the flow rate of air injected into the pressurized zone and as such to offset the lower density of the outside air.

As such, an isolation valve 42 positioned between the air outlet of the compressor 14 and that of the compressor 16, is open in order to allow the motor compressor 13 to supply air at the inlet of the exchanger 22. Similarly for the second pack, an isolation valve 43 positioned between the flow of compressed air exiting from the compressor 15 and that exiting from the compressor 16, is open in order to allow the motor compressor 13 to supply air at the inlet of the exchanger 23. During the phase on the ground and the second phase, these isolation valves 42, 43 are closed.

The motor compressor 13 is therefore connected via the interconnection pipe to the two motorized turbocompressors 11, 12. Preferably, the air supplied by the compressor 16 is shared equally between the first pack and the second pack. The three compressors 14, 15, 16 preferentially each supply a third of the total flow rate of air.

Furthermore, the isolation valves 42, 43 have a balancing function since they also make it possible to balance the flow rate of air supplied by the two packs.

The air conditioning system 10 can further comprise several devices making it possible, in the event of a breakdown of one of the components or of one of the packs of the system, i.e. when the system is no longer in nominal operating mode but in degraded operating mode, to reconfigure it so as to allow it to operate despite the breakdown or breakdowns.

For example in the first phase of operation, in the event of a breakdown of the motor compressor 13 or in the case of a rupture in the interconnection pipe, the ventilation valve 38 can be closed in order to isolate the motor compressor 13 from the two packs. Another ventilation valve 40 positioned between the compressor 14 of the motorized turbocompressor 11 and the flow orifice 26 is open so that said compressor 14 supplies the primary air flow to said orifice. As such a portion of the flow of air for breathing is diverted to the flow orifice 26 before reaching the exchanger 22. Similarly, a ventilation valve 41 is positioned between the compressor 15 of the motorized turbocompressor 12 and the flow orifice 27.

If this same breakdown of the motor compressor 13 or of the interconnection pipe occurs in the cruising phase, then only the two motorized turbocompressors supply the air for breathing in the pressurized zone. The flow rate of air injected into the pressurized zone is therefore reduced but remains acceptable from the point of view of the safety of the aircraft and its occupants.

In case of a breakdown of one of the packs, the isolation valves 42, 43 can be closed, independently of one another, in order to isolate the defective pack. The operation of the system remains the same in the first and second phases. During the third phase, the functional pack is then supercharged by the entire flow rate of air coming from the motor compressor. The flow rate in the pressurized zone is also reduced, regardless of the flight phase of the aircraft, but remains acceptable.

Finally, in case of breakdown of one of the motorized turbocompressors 11, 12, the latter is isolated using isolation valves 42, 43. The system can then operate as during a breakdown of a pack by making use of the remaining motorized turbocompressor and of the motor compressor. A different solution during the cruising phase can consist in shunting the defective motorized turbocompressor by isolating it with a valve positioned at the outlet of its compressor and in directing the flow rate of air, supplied by the motor compressor, into the exchanger of the pack of said turbocompressor in order to take advantage of the capacity of the cold air of the two packs.

This invention as such makes it possible to ensure the proper operation of an air conditioning system while still reducing the number of rotating machines and by providing sufficient redundancy in order to guarantee the operation of said system, and by guaranteeing a level and quality that is sufficient for the distribution of air. Reducing the number of rotating machines irremediably results in a decrease in the costs and in the complexity of the system and makes it possible to optimize any architecture of the air conditioning system. The architecture of such a system is then simplified. The system has better reliability and a decrease in required maintenance while still guaranteeing the same level of availability of the treated air.

The conditioning system 10 with three rotating machines is used in "more electric" aeronautical applications. This air conditioning system can, in particular, have applications on all types of aircraft, for example business aircraft or any type of commercial aircraft (single-aisle, regional, long range, . . . ).

Of course, this invention is not limited to the preferred embodiment and to the alternative embodiments shown hereinabove as non-limiting examples. It also relates to the alternative embodiments within the scope of those skilled in the art in the framework of the claims hereinafter.

What is claimed is:

1. Air conditioning system for an aircraft powered solely using electrical energy, configured to draw bleed air from outside the aircraft and deliver conditioned air to an interior of the aircraft, comprising at most three motorized rotary machines comprising:
    a first and a second motorized turbocompressor (11, 12) which are independent of one another, each motorized turbocompressor comprising a compressor (14, 15), of a turbine (20, 21) and of an electric motor (17, 18); and
    a motor compressor (13) interconnected between the motorized turbocompressors (11, 12) via an interconnection pipe and comprising a compressor (16) and an electric motor (19), and wherein the motor compressor (13) is arranged to:
        generate a primary air flow, which drives a secondary air flow, allowing a flow of air for breathing to be cooled in a first phase of operation, corresponding to a phase of operation on the ground or at relatively low altitude and at relatively low aircraft speed;
        be at shutdown or at low idle in a second phase of operation at relatively low altitude and relatively high aircraft speed; and,
        provide a top up flow of air for breathing in a third phase of operation at relatively high altitude and relatively high aircraft speed.

2. The air conditioning system according to claim 1, wherein the interconnection pipe is adapted to, in the third phase of operation, supplement with substantially equal portions the flow rate of compressed air respectively supplied by the compressor (14, 15) of each motorized turbocompressor (11, 12), using the air compressed by the motor compressor (13).

3. The air conditioning system according to claim 1, wherein the interconnection pipe comprises at least two isolation valves (42, 43) with each one positioned between the motor compressor (13) and one of the respective motorized turbocompressors (11, 12), said isolation valves being adapted to allow for the balancing of the system in a nominal operating mode and the reconfiguration thereof in a degraded operating mode in case of a breakdown.

4. The air conditioning system according to claim 1, further comprising at least one inlet plenum (28) adapted to supply outside air to the compressors (14, 15, 16) of the motorized rotating machines using at least one Ramair inlet (29).

5. The air conditioning system according to claim 1, further comprising:
    at least first and second flow orifices (26, 27) with each one associated with one of the respective motorized turbocompressors (11, 12) and each comprising a device for injecting air supplied with air by the motor compressor (13) in the first phase of operation;
    at least first and second heat exchangers (22, 23), each associated with one of the respective motorized turbocompressors (11, 12) and with one of the respective flow orifices (26, 27), with each heat exchanger being adapted to cool the air for breathing passing through the heat exchanger using the secondary air flow generated by the associated flow orifice.

6. The air conditioning system according to claim 5, wherein each flow orifice (26, 27) is adapted to ventilate the respective motorized turbocompressor (11, 12) and wherein at least one of the flow orifices (26, 27) is further adapted to ventilate the motor compressor (13).

7. The air conditioning system according to claim 5, further comprising at least four ventilation valves (38, 39, 40, 41) adapted to regulate the ventilation of the system through the flow orifices (26, 27), a first ventilation valve (40) being positioned to carry out a connection between the first flow orifice (26) and the first motorized turbocompressor (11), a second ventilation valve (38) being positioned to carry out a connection between the first flow orifice (26) and the motor compressor (13), a third ventilation valve (41) being positioned to carry out a connection between a second flow orifice (27) and the second motorized turbocompressor (12) and a fourth ventilation valve (39) being positioned to carry out a connection between the second flow orifice (27) and the motor compressor (13).

8. The air conditioning system according to claim 1, comprising at least first and second devices for drying (24, 25) air, with each one being associated with one of the respective motorized turbocompressors (11, 12) as well as with one of the respective exchangers (22, 23).

9. The air conditioning system according to claim 8, further comprising at least a first and a second altitude valve (44, 45), with each one making it possible to disconnect one of the respective devices for drying (24, 25) as well as the turbine (20, 21) of the motorized turbocompressor (11, 12) associated with said drying device.

10. The air conditioning system according to claim 1, wherein the electrical power is supplied by an electrical power supply network comprising an electrical supply channel for each motorized rotating machine.

* * * * *